US005310595A

United States Patent [19]
Ali et al.

[11] Patent Number: 5,310,595
[45] Date of Patent: May 10, 1994

[54] WATER-BASED TRANSPARENT IMAGE RECORDING SHEET FOR PLAIN PAPER COPIERS

[75] Inventors: Mahfuza B. Ali, Mendota Heights; Bill H. Dodge, North St. Paul, both of Minn.; William H. Hughes; Mohammed Iqbal, both of Austin, Tex.; Ying-Yuh Lu, Woodbury; Steven J. McMan, Stillwater, both of Minn.; Manisha Sarkar, Austin, Tex.; Chi-Ming Tseng, Woodbury, Minn.

[73] Assignee: Minnesota Mining and Manufacturing Company, St. Paul, Minn.

[21] Appl. No.: 947,252

[22] Filed: Sep. 18, 1992

[51] Int. Cl.[5] .......................... B32B 3/00; B32B 5/16; B32B 7/00

[52] U.S. Cl. .................................... 428/206; 428/195; 428/327; 428/402.24; 428/407; 428/500; 428/688

[58] Field of Search ............... 428/195, 206, 207, 327, 428/913, 342, 914, 402.24, 407, 500, 688

[56] References Cited

U.S. PATENT DOCUMENTS

| | | | |
|---|---|---|---|
| 3,535,112 | 10/1970 | Dolce et al. | 96/1.4 |
| 3,539,340 | 11/1970 | Dolce et al. | 96/1.4 |
| 3,642,930 | 2/1972 | Grasselli et al. | 260/680 |
| 4,071,362 | 1/1978 | Takenaka et al. | 96/1.4 |
| 4,085,245 | 4/1978 | De Vito et al. | 428/215 |
| 4,259,422 | 3/1981 | Davison et al. | 430/17 |
| 4,480,003 | 10/1984 | Edwards et al. | 428/329 |
| 4,489,122 | 12/1984 | Kammin et al. | 428/212 |
| 4,869,955 | 9/1989 | Ashcraft | 428/327 |
| 4,912,009 | 3/1990 | Amering et al. | 430/137 |
| 4,952,650 | 8/1992 | Young et al. | 526/194 |
| 4,956,223 | 9/1990 | Aria et al. | 428/212 |
| 4,956,225 | 9/1990 | Malhotra | 428/216 |
| 5,084,339 | 1/1992 | Tachibana et al. | 428/327 |
| 5,104,731 | 4/1992 | Gager | 428/323 |

FOREIGN PATENT DOCUMENTS

| | | | |
|---|---|---|---|
| 398223A | of 0000 | European Pat. Off. | B32B 5/16 |
| 0349227A2 | 1/1990 | European Pat. Off. | G03G 7/00 |
| 0408197A2 | 1/1991 | European Pat. Off. | G03G 7/00 |
| 0442567A2 | 2/1991 | European Pat. Off. | G03G 7/00 |
| 55-84654 | of 0000 | Japan | C07C 5/18 |
| 57-42741 | 3/1982 | Japan | C08K 7/00 |
| 61-174541 | 6/1986 | Japan | G03C 1/68 |
| 1289838 | 11/1989 | Japan | C08J 7/04 |

*Primary Examiner*—Patrick J. Ryan
*Assistant Examiner*—William A. Krynski
*Attorney, Agent, or Firm*—Gary L. Griswold; Walter N. Kirn; Darla P. Neaveill

[57] ABSTRACT

An image recording sheet and a transparent water-based toner receptive coating therefore comprising an imaging copolymer formed from at least one monomer selected from the group consisting of bicyclic alkyl (meth) acrylates, aliphatic alkyl (meth)acrylates having from about one to about 12 carbon atoms, aromatic (meth)acrylates, and a polar monomer having the formula:

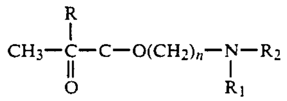

wherein R is hydrogen or methyl, $R_1$ and R2 may be hydrogen, identical or differing alkyl groups having up to about 8 carbon atoms, preferably up to about 2 carbon atoms, or the quaternary cationic salts thereof, at least one novel long chain polymeric particle having good antifriction characteristics and optionally, an antistatic agent selected from the group consisting of cationic agents, anionic agents, fluorinated agents, and nonionic agents.

10 Claims, No Drawings

WATER-BASED TRANSPARENT IMAGE RECORDING SHEET FOR PLAIN PAPER COPIERS

BACKGROUND OF THE INVENTION

1. Field of the Invention

This invention relates to transparent recording materials suitable for use in electrography and xerography. Specifically, it relates to coatings for transparencies having specific physical properties for use in overhead projectors.

2. Description of Related Art

In the formation and development of xerographic images, a toner composition comprised of resin particles and pigment particles is generally applied to a latent image generated on a photoconductive member. Thereafter, the image is transferred to a suitable substrate, and affixed there, by the application of heat, pressure, or a combination thereof. It is also known that transparencies can be selected as a receiver for this transferred developed image originating from the photoconductive member. The transparencies are suitable for use with commercially available overhead projectors. Typically, these transparent sheets are comprised of thin films of one or more organic resins such as polyesters which have undesirably poor toner composition adhesion.

Many different types of transparencies are known in the art. They can be made by different printing and imaging methods, such as thermal transfer printing, ink-jet printing and plain paper copying. U.S. Pat. No. 3,535,112 discloses transparencies comprised of a supporting substrate, and polyamide overcoatings. U.S. Pat. No. 3,539,340 discloses transparencies comprised of a supporting substrate and coatings thereover of vinylchloride copolymers. Also known are transparencies with overcoatings of styrene/acrylate, or methacrylate ester copolymers, as discussed in U.S. Pat. No. 4,071,362; transparencies with blends of acrylic polymers and vinyl chloride/vinylacetate polymers, as illustrated in U.S. Pat. No. 4,085,245, and transparencies with coatings of hydrophilic colloids as recited in U.S. Pat. No. 4,259,422. U.S. Pat. No. 4,489,122 discloses transparencies with elastomeric polymers overcoated with poly(vinylacetate), or terpolymers thereof.

U.S. Pat. No. 4,956,223 discloses an ink jet recording medium comprising a recording surface having a characteristic of directional diffuse reflection. The recording medium can be a transparent substrate having an ink-receiving coating thereon. The ink-receiving layer contains pigments such as mica, pearl pigments, and metal powders therein.

Japanese Patent No. 1289838A discloses a composite polyester film having a cover layer comprising a concentration of sulfonic acid or sulfonate on at least one surface. The composite film is taught to eliminate "pile traveling" (simultaneous feeding of more than one sheet), and yield excellent transparency flatness, and easy toner adhesion.

EP 398223A discloses a plastic film comprising a support and an antistatic layer, particularly useful in light-sensitive silver halide photographic materials having excellent antistatic abilities and no haze, even when quickly dried. The film also has no deterioration of antistatic abilities after processing steps such as development. The antistatic layer comprises a reaction product of a water-soluble electroconductive polymer, hydrophobic polymer particles and a curing agent, characterized in that the polymer has a polyalkylene oxide chain.

Japanese Laid-Open Publication 57-42741 discloses an antistatic composition for use with plastics, which can be coated on the surface, adsorbed onto the surface after dilution with an appropriate solvent, or mixed into the plastic composition prior to molding. The antistatic composition contains 5–95 parts anionic surfactant containing a perfluorocarbon chain with a carbon chain length of 4–16, and 5–95 parts of a nonionic surfactant also having a 4–16 carbon containing perfluorocarbon chain.

The final plastic contains 0.01 part to 5 parts of the antistatic composition per 100 parts plastic when cOated or adsorbed and 0.01 to 10 parts per 100 parts plastic when the antistatic composition is premixed with the plastic.

Japanese Laid-Open Publications 84654/1980 and 174541/1986 disclose antistatic layers which comprise a water-soluble electroconductive polymer having a carboxyl group, a hydrophobic polymer having a carboxyl group and a polyfunctional aziridine. It is disclosed that with this method, antistatic ability can remain after developing (photographic), but transparency of the coated film is greatly dependant on the drying speed. The transparency was unusable when fast-drying techniques were used.

U.S. Pat. No. 4,480,003 discloses a transparency film for use in plain paper electrostatic copiers. The base of the transparency film is a flexible, transparent, heat resistant polymeric film. An image receiving layer, preferably, a toner-receptive, thermoplastic, transparent polymethyl methacrylate polymer containing dispersed silica particles is coated on a first major surface of the polymeric film. On the second major surface of the film base is coated a layer of non-migratory electrically conductive material, preferably a polymer derived from the reaction of pyridine and 2 amino-pyridine with partially chloromethylated polystyrene. It is preferred that a primer coating be interposed between the polymeric film base and the layer of conductive material to provide suitable adhesion of the coating to the film base. It is also preferred that the layer of conductive material be over-coated with a protective coating having additives to control abrasion, resistance, roughness and slip properties. It is disclosed that the sheet can be fed smoothly from a stack and produces clear background areas.

U.S. Pat. No. 4,869,955 discloses an element suitable for preparing transparencies using an electrostatic plain paper copier. The element comprises a polyethylene terephthalate support (polyester), at least one subbing layer coated thereon and, coated to the subbing layer, a toner receptive layer comprising a mixture of an acrylate binder, a polymeric antistatic agent having carboxylic acid groups, a crosslinking agent, butylmethacrylate modified polymethacrylate beads and submicron polyethylene beads. These elements produce excellent transparencies.

U.S. Pat. No. 4,956,225 discloses yet another transparency suitable for electrographic and xerographic imaging comprising a polymeric substrate with a toner receptive coating on one surface thereof. The toner receptive coating comprises blends selected from a group consisting of: poly(ethylene oxide) and carboxymethyl cellulose; poly(ethylene oxide), carboxymethyl cellulose and hydroxypropyl cellulose; poly(ethylene oxide) and vinylidene fluoride/hexafluoropropylene copolymer; poly(chloroprene) and poly(alpha-methylstyrene); poly(caprolactone) and poly(alpha-methylstyrene); poly(vinyl isobutylether) and poly(alpha-methylstyrene); poly(caprolactone) and poly (α-methylstyrene); chlorinated poly(propylene) and poly(α-methylstyrene); chlorinated poly(ethylene) and poly(α-methylstyrene); and chlorinated rubber and poly(α-methylstyrene). Also disclosed are transparencies with first and second coating layers.

EP Application 0349,227 discloses a transparent laminate film for full color image-forming comprising two transparent resin layers. The first resin layer is heat-resistant, and the second resin layer must be compatible with a binder resin constituting the toner to be used for color image formation. The second resin layer has a larger elasticity than that of the binder resin of the toner at a fixing temperature of the toner. The second resin can be of the same "kind" i.e., type, e.g., styrene-type or polyester type, as the toner binder, as long as the resins differ in storage elasticity.

EP 408197A2 discloses an imageable copy film comprising a thermoplastic polymeric film substrate with a widthwise thermal expansion of 0.01 to 1% at 150° C. and a lengthwise thermal shrinkage in the film of 0.4 to 2.0% at 150° C. The substrate has a receiving layer on at least one surface thereof comprising an acrylic and/or methacrylic resin comprising any film-forming resin, e.g., polymers derived from alkyl esters having up to 10 carbon atoms, e.g. methyl, ethyl, n-propyl, isopropyl, n-butyl, isobutyl, tert-butyl, hexyl, 2-ethylhexyl, heptyl and n-octyl. The use of ethylacrylate or butylacrylate together with an alkylmethacrylate is preferred. Other suitable monomers include acrylonitrile, methacrylonitrile, halo substituted acrylonitrile and (meth)acrylonitrile, acrylamide, methacrylamide, n-methylol acrylamide and methacrylamide, n-ethanol acrylamide and methacrylamide, n-propanol acrylamide and methacrylamide, t-butylacrylamide, hydroxyl ethylacrylamide, glycidyl acrylate, and methacrylate, dimethylamino ethyl methacrylate, itaconic anhydride and half ester of itaconic acid. Vinyl monomers such as vinylacetate, vinylchloroacetate, vinyl benzene, vinyl pyridine, vinyl chloride, vinylidene chloride, maleic acid, maleic anhydride, styrene and substituted styrene, and the like can optionally be included.

EP 442567A2 discloses a medium for electrophotographic printing or copying comprising a polymeric substrate coated with a polymeric coating having a Tukon hardness of about 0.5 to 5.0 and a glass transition temperature of about 5° to 45° C. The coating comprises at least one pigment which provides a coefficient of static friction of from 0.20 to 0.80 and a coefficient of dynamic friction of from 0.10 to 0.40. The medium has improved image quality and toner adhesion. It is particularly useful in laser electrophotographic printing. The polymer employed in the coating can contain thermosetting or thermoplastic resins, and preferably aqueous acrylic emulsions such as Rhoplex™ resins from Rohm and Haas.

U.S. Pat. No. 5,104,731 discloses a dry toner imaging film media having good toner affinity, anti-static properties, embossing resistance and good feedability through electrophotographic copies and printers. The media comprises a suitable polymeric substrate with an antistatic matrix layer coated thereon. The matrix layer has resistance to blocking at 78° C. after 30 minutes and a surface resistivity of from about $1\times10^{8}$ to about $1\times10^{14}$ ohms per square at 20° C. and 50% relative humidity. The matrix contains one or more thermoplastic polymers having a $T_g$ of 5° C. to 75° C., and at least one crosslinked polymer which is resistant to hot roll fuser embossing, at least one of the polymers being electrically conductive.

Although there are a host of recording sheets available for use, as illustrated by the prior art, there remains a need for new recording sheets having coatings that will enable the formation of images with high optical densities, good feedability, low haze and excellent toner adhesion, especially for use with high speed copiers.

While toner adhesion problems can be eliminated if one uses similar types of binder resin both for the toner and recording sheet coating, as discussed in EP 0349,227 above, that means the coating for the recording sheets has to be changed every time a different toner resin is used. Also, some of these toner resins are only be feasible in solvent-based coatings, as disclosed in EP 0349,227.

The present inventors have now discovered a class of polymers that can be coated in an aqueous medium to produce a transparency image on various copiers using a variety of toners with different binder resins, with excellent adhesion, good image quality and good feedability.

SUMMARY OF THE INVENTION

The invention provides a transparent water-based toner-receptive coating comprising:

a) from about 65 to about 99.9 parts of an imaging copolymer formed from
   1) from about 80 parts to about 99 parts of at least one monomer selected from the group consisting of bicyclic alkyl (meth)acrylates, aliphatic alkyl (meth)acrylates having from about one to about 12 carbon atoms, aromatic (meth)acrylates, and
   2) from about 1 parts to about 20 parts of a polar monomer having the formula:

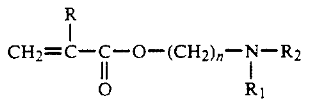

wherein R is hydrogen or methyl, $R_1$ and $R_2$ is selected from the group consisting of hydrogen, identical, and differing alkyl groups having up to about 8 carbon atoms, preferably up to about 2 carbon atoms, the N-group can also comprise a cationic salt thereof, and b) from about 0.1 to about 15 parts of at least one novel polymeric particle comprising
   1) .t least about 20 parts by weight polymerized diol di(meth)acrylate having a formula $$CH_2{=}CR^2COOC_nH_{2n}OOCR^2{=}CH_2$$

wherein $R^2$ is hydrogen or a methyl group, and n is an integer from about 4 to about 18, 2) from 0 to about 80 parts of at least one copolymerized vinyl monomer having the formula $$CH_2{=}CR^2COOC_mH_{2m+1}$$

wherein $R^2$ is hydrogen or a methyl group and m is an integer of from about 12 to about 40, and 3) from 0 to about 30 parts of at least one copolymerized ethylenically unsaturated monomer selected from the group consisting of vinyl esters, acrylic esters, methacrylic esters, styrene, derivatives thereof, and mixtures thereof, a, b and c having a total of 100 parts, c) from 0 to about 20 parts of an antistatic agent selected from the group consisting of cationic agents, anionic agents, fluorinated agents, and nonionic agents.

Preferred recording sheets of the invention comprise a bimodal particulate filler system comprising at least one novel polymeric particle, and having an average particle size of from about 0.25 μm to about 15 μm; however, a narrow particle size distribution is also preferred, i.e., a standard deviation of up to 20% of the average particle size.

The toner receptive layer can be coated out of a water-based emulsion or aqueous solution using well-known coating techniques. For coating out of an emulsion, at least one nonionic emulsifier with hydrophilic/-lipophilic balance (HLB) of at least about 10 is also present. For sheets coated out of a solution, the polar monomer is a cationic salt selected from the group consisting of

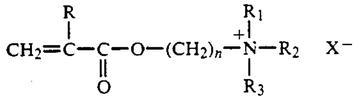

wherein R is hydrogen or methyl, $R_1$ and $R_2$ may be hydrogen, identical or differing alkyl groups having up to about 8 carbon atoms, preferably up to about 2 carbon atoms, $R_3$ is an alkyl group having up to twenty carbon atoms containing a polar group such as —OH, —$NH_2$, COOH, and X is a halide. To make the polymer water soluble, it is preferred to have the cationic monomer with fewer carbon atoms.

Optionally, a crosslinker may also be present. The coating polymer can be prepared using any typical emulsion polymerization technique in an aqueous medium.

The present invention also provides a water-based transparent image recording sheet suitable for use in any electrographic and xerographic plain paper copying device comprising a transparent substrate, bearing on at least one major surface thereof the transparent water-based toner-receptive coating described above.

As used herein, the term "polymer" includes both homopolymers and copolymers.

All parts, percents, and ratios herein are by weight unless otherwise noted.

DETAILED DESCRIPTION OF THE INVENTION

The imaging copolymer contains from about 80 parts to about 99 parts of at least one monomer selected from the group consisting of bicyclic alkyl (meth)acrylates, aliphatic alkyl (meth)acrylates having from about one to about twelve carbon atoms, and aromatic (meth)acrylates.

Copolymers containing at least one bicyclic alkyl (meth)acrylate are preferred for use with most commercial copiers, as they improve the adhesion of toner to the image receptive coating. Useful bicyclic (meth)acrylates include, but are not limited to, dicyclopentenyl (meth)acrylate, norbornyl (meth)acrylate, 5-norborene-2-methanol, and isobornyl (meth)acrylate. Preferred bicyclic monomers include dicyclopententyl (meth)acrylate, and isobornyl (meth)acrylate.

Useful aliphatic alkyl (meth)acrylates include, but are not limited to, methyl acrylate, ethyl acrylate, methyl (meth)acrylate, isobutyl (meth)acrylate, isodecyl (meth-)acrylate, cyclohexyl (meth)acrylate, and the like. Preferred aliphatic monomers include methyl (meth)acrylate, ethyl (meth)acrylate, and isodecyl (meth)acrylate.

For imaging polymers to be emulsion polymerized, the bicyclic alkyl (meth)acrylates preferably comprise from about 10 parts to about 80 parts, more preferably from 20 parts to about 60 parts. For solution polymers, the preferred minimum amount is lower, i.e., about 5 parts, more preferably about 10 parts.

Most copiers have a styrene based toner system; the addition of styrene and substituted styrene monomers yield imaging sheets having very good toner adhesion with such machines.

The copolymer must also contain from about 1 to about 20 parts of a polar monomer having the formula:

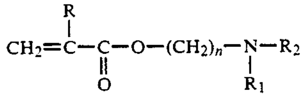

wherein R is hydrogen or methyl, $R_1$ and $R_2$ is selected from the group consisting of hydrogen, identical, and differing alkyl groups having up to about 8 carbon atoms, preferably up to about 2 carbon atoms; the N-group can also comprise a cationic salt thereof.

Useful examples include N,N-dialkyl monoalkyl amino ethyl (meth)acrylate, and N,N-dialkyl monoalkyl amino methyl (meth)acrylate, N-butyl amino ethyl (meth)acrylate, and the like for emulsion polymers, and quaternary ammonium salts thereof for solution polymers. Preferred monomers include N,N'-diethylaminoethyl(meth)acrylate, and N,N'-dimethylaminoethyl(-meth)acrylate for emulsion polymers and bromoethanol salts of N,N'-dimethyl aminoethyl(meth)acrylate, and N,N'-diethyl aminoethyl(meth)acrylate for solution polymers. The presence of these polar monomers improves the adhesion of the toner receptive coating to the transparent film substrate or backing.

Preferred copolymers comprise at least two monomers selected from aliphatic alkyl (meth)acrylate monomers and bicyclic alkyl (meth)acrylates.

The novel polymeric microspheres used in the image recording sheets of the invention are produced from diol di(meth)acrylate homopolymers which impart anti-friction characteristics when coated on image recording sheets. These diol di(meth)acrylates can be reacted with long-chain fatty alcohol esters of (meth)acrylic acid.

Specifically the microspheres comprise at least about 20 percent by weight polymerized diol di(meth)acrylate having a formula $$CH_2{=}CR_2COOC_nH_{2n}OOCCR_2{=}CH_2$$

wherein $R_2$ is hydrogen or a methyl group, and n is an integer from about 4 to about 18. Examples of these monomers include those selected from the group consisting of 1,4-butanediol di(meth)acrylate, 1,6-hexanediol di(meth)acrylate, 1,8-octanediol di(meth)acrylate, 1,10-decanediol di(meth)acrylate, 1,12-dodecanediol di(meth)acrylate, 1,14-tetradecanediol di(meth)acrylate, and mixtures thereof.

Preferred monomers include those selected from the group consisting of 1,4-butanediol di(meth)acrylate, 1,6 hexanediol di(meth)acrylate, 1,12-dodecanediol di(meth)acrylate, and 1,14-tetradecanediol di(meth)acrylate.

The microspheres may contain up to about 80 weight percent of at least one copolymerized vinyl monomer having the formula $$CH_2{=}CR_2COOC_mH_{2m+1}$$

wherein $R^2$ is hydrogen or a methyl group and m is an integer of from about 12 to about 40.

Useful long-chain monomers include, but are not limited to lauryl (meth)acrylate, octadecyl (meth)acrylate, stearyl (meth)acrylate, and mixtures thereof, preferably stearyl (meth)acrylate.

The microspheres may optionally contain up to about 30 percent by weight of at least one copolymerized ethylenically unsaturated monomer selected from the group consisting of vinyl esters such as vinyl acetate, vinyl propionate, and vinyl pivalate; acrylic esters such as methacrylate, cyclohexylacrylate, benzylacrylate, isobornyl acrylate, hydroxybutylacrylate and glycidyl acrylate; methacrylic esters such as methyl methacrylate, butyl methacrylate, cyclohexyl methacrylate, benzyl methacrylate, γ-methacryloxypropyl trimethoxysilane, and glycidyl methacrylate; styrene; vinyltoluene; α-methyl styrene, and mixtures thereof. Most preferred beads include 50/50 poly(hexanediol-diacrylate/stearyl methacrylate), and 50/50 poly(butanediol-diacrylate)/-lauryl(meth)acrylate, 80/20 poly(hexanediol-diacrylate)/stearyl(meth)acrylate, 50/50 polymethylmethacrylate/1,6 hexanediol-diacrylate, $C_{14}$ dioldiacrylate, and $C_{12}$ dioldi(meth)acrylate.

In addition to the above, beads of the present invention may also optionally comprise additives which are not ethylenically unsaturated, but which contain functional groups capable of reacting with materials containing reactive groups which may also be coated on the substrate along with the anti-friction beads. Such additives are useful in modifying the degree of interaction or bonding between the beads and the imaging polymer. Suitable examples include organosilane coupling agents having alkyl groups with 1 to about 8 carbon atoms, such as glycidoxy trimethoxysilanes such as γ-glycidoxypropyltrimethoxysilane, and (aminoalkylamino) alkyl trimethoxysilanes such as 3-(2-amino ethyl amino) propyl trimethoxysilane.

For good feedability, the mean particle size preferably ranges from about 0.25 μm to about 15 μm. Particles smaller than 0.25 μm would require the use of more particles to produce an effective coefficient of friction, this would tend to also produce more haze. Larger particles than 15 μm would require thicker coatings to anchor the particles firmly in the coatings, which would increase haze and coating cost. For good performance, the particles preferably have narrow particle size distributions, i.e., a standard deviation of up to 20% of the average particle size. These ranges are preferably 0.1–0.7 μm, 1–6 μm, 3–6 μm, 4–8 μm, 6–10 μm, 8–12 μm, 10–15 μm. More preferred particles are those having bimodal particle size distributions. This is made by mixing particles having 2 different particle size distributions such as particles having a distribution of sizes from 1–4 μm mixed with 6–10 μm. When bimodal particles are used, both particles can be selected from the preferred novel polymeric beads described above, or one of the particles can be selected from such preferred beads and one selected from other beads such as PMMA and polyethylene beads, the second type of bead also preferably having a narrow particle size distribution.

Most preferably, both bimodal particles are selected from beads produced from the copolymer of hexanedioldiacrylate and stearylmethacrylate, having particle size distributions of from about 1 to about 4 μm and from about 6 to about 10 μm, or from about 2 to about 6 μm and from about 8 to about 12 μm, or from about 0.20 to 0.5 μm and from about 1–6 μm.

Coatings for the transparency films useful for copying devices typically range in thickness from 100 nm to 1500 nm, preferably 200 nm to 500 nm. If large particles are used, then the coating thickness must be increased accordingly to ensure that enough coating material is present to anchor the particles onto the transparent substrate, while the coating thickness can be correspondingly lowered for smaller particles. Hence the most preferred particle size distributions chosen reflect more on the coating thickness than the feeding performance of other larger particle sizes and vice versa.

The microspheres are polymerized by means of conventional free-radical polymerization, e.g., those suspension polymerization methods described in U.S. Pat. No. 4,952,650, and 4,912,009, incorporated herein by reference, or by suspension polymerization using a surfactant as the suspending agent, and use those initiators normally suitable for free-radical initiation of acrylate monomers. These initiators include azo compounds such as 2,2-azobis, 2-methyl butyronitrile and 2,2-azobis (isobutyronitrile); and organic peroxides such as benzoylperoxide and lauroylperoxide. For submicron beads, suspension polymerization is used wherein the suspending agent is a surfactant.

An antistatic agent may also be present in the toner receptive layer. Useful agents are selected from the group consisting of nonionic antistatic agents, cationic agents, anionic agents, and fluorinated agents. Useful agents include such as those available under the trade name AMTER TM, e.g., AMTER TM 110, 1002, 1003, 1006, and the like, derivatives of Jeffamine TM ED-4000, 900, 2000 with FX8 and FX10, available from 3M, Larostat TM 60A, and Markastat TM AL-14, available from Mazer Chemical Co., with the preferred antistatic agents being steramidopropyldimethyl-β-hydroxyethyl ammonium nitrate, available as Cyastat TM SN, N,N'-bis(2-hydroxyethyl)-N-(3'-dodecyloxy-2'2-hydroxylpropyl) methylammonium methylsulfate, available as Cyastat TM 609, both from American Cyanamid. When the antistatic agent is present, amounts of up to 20% (solids/solids) may be used. Preferred amounts vary, depending on coating weight. When higher coating weights are used, 1–10% is preferred, when lower coating weights are used, 5–15% is preferred.

Where emulsion polymerization of the image polymer layer is desired, an emulsifier must also be present. These include nonionic, or anionic emulsifiers, and mixtures thereof, with nonionic emulsifiers being preferred. Suitable emulsifiers include those having a HLB of at least about 10, preferably from about 12 to about 18. Useful nonionic emulsifiers include $C_{11}$ to $C_{18}$ polyethylene oxide ethanol, such as Tergitol TM especially those designated series "S" from Union Carbide Corp, those available as Triton TM from Rohm and Haas Co., and the Tween TM series available from ICI America. Useful anionic emulsifiers include sodium salts of alkyl sulfates, alkyl sulfonates, alkylether sulfates, oleate sulfates, alkylarylether sulfates, alkylarylpolyether sulfates, and the like. Commercially available examples include such as those available under the trade names Siponate TM and Siponic TM from Alcolac, Inc., When used, the emulsifier is present at levels of from about 1% to about 7%, based on polymer, preferably from about 2% to about 5%.

Additional wetting agents with HLB values of 7–10 may be present in the emulsion to improve coatability. These additional surfactants are added after polymerization is complete, prior to coating of the polymeric substrate. Preferred additional wetting agents include fluorochemical surfactants such as

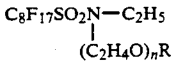

wherein n is from about 6 to about 15 and R can by hydrogen or methyl. Useful examples include FC-170C and FC-171. available from 3M. Another useful wetting agent is Triton TM X-100, available from Union Carbide.

Addition of a coalescing agent is also preferred for emulsion based image receptive layers to insure that the coated material coalesces to form a continuous and integral layer and will not flake in conventional copiers under copying and fixing conditions. Compatible coalescing agents include propylcarbitol, available from Union Carbide as the Carbitol TM series, as well as the Cellusolve TM series, Propasolve TM series, Ektasolve TM and Ektasolve series of coalescing agents, also from Union Carbide. Other useful agents include the acetate series from Eastman Chemicals Inc., the Dowanol TM E series, Dowanol TM E acetate series, Dowanol TM PM series and their acetate series from Dow Chemical, N-methyl-2-pyrolidone from GAF, and 3-hydroxy-2,2,4-trimethyl pentyl isobutryate, available as Texanol TM, from Eastman Chemicals Inc. These coalescing agents can be used singly or as a mixture.

Other optional ingredients may be present in the image-forming polymer for the purposes of improving coatability, or other features. Useful additives include such as crosslinking agents, catalysts, thickeners, adhesion promotors, glycols, defoamers and the like.

One preferred optional ingredient in the emulsion polymerized embodiment of the invention is an additional adhesion promotor to enhance durability of thicker coatings to the substrate. Useful adhesion promotors include organofunctional silanes having the following general formula:

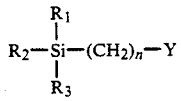

wherein $R_1$, $R_2$, and $R_3$ are selected from the group consisting of an alkoxy group and an alkyl group with the proviso that at least one alkoxy group is present, n is an integer from 0 to 4, and Y is an organofunctional group selected from the group consisting of chloro, methacryloxy, amino, glycidoxy, and mercapto. Useful silane coupling agents include such as γ-aminopropyl trimethoxysilane, vinyl triethoxy silane, vinyl tris(β-methoxy ethoxy)-silane, vinyl triacetoxy silane,γ-methacryloxypropyltrimethyoxy silane, γ-(β-amino ethyl)aminopropyl trimethoxysilane, and the like. The adhesion promotor may be present at levels of from about 0.5 to about 15% of the total resin, preferably from about 4% to about 10%.

The imaging recording sheet of the invention may also comprise an ink-permeable protective layer such as polyvinyl alcohol, and the like, to insure faster drying.

Film substrates may be formed from any polymer capable of forming a self-supporting sheet, e.g., films of cellulose esters such as cellulose triacetate or diacetate, polystyrene, polyamides, vinyl chloride polymers and copolymers, polyolefin and polyallomer polymers and copolymers, polysulphones, polycarbonates, polyesters, and blends thereof. Suitable films may be produced from polyesters obtained by condensing one or more dicarboxylic acids or their lower alkyl diesters in which the alkyl group contains up to about 6 carbon atoms, e.g., terephthalic acid, isophthalic, phthalic, 2,5-,2,6-, and 2,7-naphthalene dicarboxylic acid, succinic acid, sebacic acid, adipic acid, azelaic acid, with one or more glycols such as ethylene glycol, 1,3-propanediol, 1,4-butanediol, and the like.

Preferred film substrates or backings are cellulose triacetate or cellulose diacetate, polyesters, especially polyethylene terephthalate, and polystyrene films. Polyethylene terephthalate is most preferred. It is preferred that film backings have a caliper ranging from about 50 μm to about 150 μm. Film backings having a caliper of less than about 50 μm are difficult to handle using conventional methods for graphic materials. Film backings having calipers over 150 μm are very stiff, and present feeding difficulties in certain commercially available copying machines.

When polyester film substrates are used, they can be biaxially oriented to impart molecular orientation before the imaging layer is coated thereon, and may also be heat set for dimensional stability during fusion of the image to the support. These films may be produced by any conventional extrusion method.

In some embodiments, the polyester film is extruded or cast, and uniaxially oriented in the machine direction. The imaging layer is then coated thereon. The composite can then undergo further orientation in the transverse direction to produce a finished product. When this process is used, the coated layer exhibits evidence of such stretching under optical microscopy, but surprisingly, the coating remains transparent, and the polymer, whether emulsion or solution polymerized, exists in a continuous coated layer without voids, thus showing the high integrity and cohesiveness of the coated layer.

To promote adhesion of the receptive layer to the film substrate, it may be desirable to treat the surface of the film substrate with one or more primers, in single or multiple layers. Useful primers include those known to have a swelling effect on the substrate polymer. Examples include halogenated phenols dissolved in organic solvents. Alternatively, the surface of the film substrate may be modified by treatment such as corona treatment or plasma treatment.

The primer layer, when used, should be relatively thin, preferably less than 2 μm, most preferably less than 1 μm, and may be coated by conventional coating methods.

Transparencies of the invention are particularly useful in the production of imaged transparencies for viewing in a transmission mode or a reflective mode, i.e., in association with an overhead projector.

The following examples are for illustrative purposes, and do not limit the scope of the invention, which is that defined by the claims.

GLOSSARY

| Glossary | |
|---|---|
| BHT | 2 TERT-BUTYL 4-METHYL PHENOL |
| DMAEMA | DIMETHYLAMINOETHYL METHACRYLATE |
| DMAEMA-SALT | DIMETHYLAMINOETHYL METHACRYLATE BROMOETHANOL SALT |
| DEAEMA-SALT | DIETHYLAMINOETHYL METHACRYLATE BROMOETHANOL SALT |
| EA | ETHYL ACRYLATE |
| GMA | GLYCIDYL METHYLACRLATE |
| HBA | HYDROXYBUTYLACRYLATE |
| HEA | HYDROXYETHYLACRYLATE |
| HEMA | HYDROXYETHYL METHACRYLATE |
| IBOA | ISOBORNYL ACRYLATE |
| IBOMA | ISOBORNYL METHACRYLATE |
| LA/BDDA | LAURYLACRYLATE BUTANEDIOLDIACRYLATE |
| MA | METHYL ACRYLATE |
| MMA | METHYL METHACRYLATE |
| NMP | N-METHYLPYRROLIDONE |
| PMMA | POLYMETHYL METHACRYLATE |
| SMA | A 50/50 HEXANEDIOLDIACRYLATE/STEARYL METHACRYLATE BEAD |
| Z6040 | GLYCIDOXYPROPYL TRIMETHOXYSILANE |

Toner Adhesion Test

ASTM D2197-86 "Adhesion of Organic Coatings by Scope Adhesion" was used to measure toner adhesion to the coated surface of the film. The measurements were done on samples after the coated film was imaged on a variety of commercially available copiers, specifically Xerox 5065. The results were recorded in grams. A measurement of about 200 gms or more is acceptable.

TEST METHODS

Coefficient of Friction

The Coefficient of Friction or COF of two stationary contacting bodies is defined as the ratio of the normal force "N", which holds the bodies together and the tangential force "$F_1$", which is applied to one of the bodies such that sliding against each other is induced.

A model SP-102B-3M90 Slip/Peel Tester, from Imass Co. was used to test the COF of articles of the invention. The bead-coated sides of two sheets are brought into contact with each other, with 1 sheet attached to a 1 kg brass sled, tethered to a force gauge and the second sheet attached to the moveable platen. The platen is drawn at a constant speed of 15.24 cm/min., and the maximum and average COF values are obtained from the tester readout and recorded.

Surface Conductivity

Surface conductivity of the coated film was measured using a Model 240A High Voltage Supply, available from Keithley Instruments, along with a Model 410A Picoammeter and a Model 6105 Resistivity Adapter. The film samples prepared were 8.75 cm×8.75 cm in size and were conditioned by sitting at 23° C and 50% RH overnight. The surface conductivity was measured by placing the film sample between the 2 capacitor plates and applying a 500 volt charge. The surface current is then measured in amps, and converted to resistivity by using the following formula:

$$R = \frac{53.4 \times V}{I}$$

wherein R equals the resistivity (ohms/sq), V is the voltage, and I is current (amps).

Haze

Haze is measured with the Gardner Model XL-211 Hazeguard hazemeter or equivalent instrument. The procedure is set forth in ASTM D 1003-61 (Reapproved 1977). This procedure measures haze, both of the unprocessed film (precopy) and the post copy film, as noted hereinafter.

Coating Durability Test

Durability is measured using the SP-102B-3M90 Slip/Peel Tester available from Imass, equipped with an MB-5 load cell. The platen speed was set at 15.24 cm/minute. A 1 cm×2 cm rubber was attached by a piece of double-coated tape to the middle of the sled with the 2 cm side parallel to the direction of the sliding motion. Test samples of the image receptive film were cut into 5 cm×20 cm and 2.5 by 5 cm pieces. The 5 cm×20 cm test piece is attached with double-coated tape to the left end of the platen and both sides of the 200 g sled weight just above and below the 1 cm×2 cm rubber, The 2 cm×5 cm test piece is then attached to the 200 g sled such that the 2 cm side is parallel to the 5 cm side of the rubber. Both test pieces are pressed to assure that they are flat and centered. They are then labeled and marked. One end of a 20 cm long 12 Kg steel finishing line leader was permanently connected to the 200 gms sled and the other end to the load cell. The sled is positioned above the left end of the platen and aligned with it to assure that the leader is in a relaxed state. The sled is then gently laid onto the test sample. 500 gms of additional weight is added to the sled and the platen is activated. After travelling for a distance of about 8 cm, the platen is stopped and the sample removed to rate the durability. The ratings are according to the following scale:

1—positive for both coating removal and particle flaking.
2—negative for coating removal, positive to particle flaking.
3—positive for scratches, negative for both coating removal and particle flaking.
4—negative for scratches, coating removal and particle flaking.

Stack Feeding Test

This test defines the number of failures per 100 sheets fed. Receptor sheets were conditioned in a stack at a temperature of 25° C. and 50% relative humidity. overnight prior to feed testing. Any jamming, misfeed or other problems during the copying process was recorded as a failure.

Synthesis of DMAEMA-SALT

A vessel was fitted with a mechanical stirrer, a thermometer, a condenser and a nitrogen in/out let. To the vessel 18.9 parts of dimethylaminoethyl methacrylate (DMAEMA), 9.4 parts of acetone and 0.04 parts of 2-tertbutyl-4methylphenol (BHT) were charged. The solution was mixed by medium agitation. Then 15.1 parts of 2-Bromoethanol dissolved in 7.8 parts of acetone was added to the vessel slowly. The reaction solution was heated for 24 hours at 35° C. A sample was taken out and percent solids analysis revealed the quantitative reaction. Acetone was removed by vacuum stripping at 35° C. to obtain a solid mass. The solids were transferred to a filter funnel and washed three times with 30 parts of cold cyclohexane each. To make a moisture-free atmosphere, a blanket of nitrogen was maintained throughout the workup. The proton NMR analysis of the solid revealed the presence of a pure DMAEMA-SALT.

Synthesis of DEAEMA-SALT

A vessel was fitted with a condenser, a thermometer and a mechanical stirrer. To the vessel 44.4 parts of diethylaminoethyl methacrylate, 40 parts of tetrahydrofuran and 0.3 parts of BHT were charged. Then 30.0 parts of bromoethanol was added to the vessel. The solution was heated for 24 hours at 50° C. with medium agitation. After the reaction, a viscous layer was formed at the bottom of the flask. The viscous layer was isolated with a separatory funnel and washed three times with 30 parts cold cyclohexane. The viscous liquid was transferred to a flask and dried in a Rota-Vap TM under vacuum at 40° C. The proton NMR spectrum analysis revealed the presence of pure DEAEMA-SALT.

Preparation of Polymeric Beads

A. Preparation of Diethanolamine-Adipic Acid Condensate Promoter. Equimolar amounts of adipic acid and diethanolamine were heated and stirred in a closed reaction flask. Dry nitrogen was constantly bubbled through the reaction mixture to remove water vapor, which was condensed and collected in a Barrett trap. When 1-1.5 moles of water based on 1 mole of adipic acid and 1 mole of diethanolamine had been collected, the reaction was stopped by cooling the mixture. The resulting condensate was diluted with water.

B. An aqueous mixture of 600 g deionized water, 10 g Ludox SM-30 colloidal silica, available from DuPont, 2.4 gms of 10% solution of diethanolamine-adipic acid condensate promoter (supra) and 0.13 gm of potassium dichromate was stirred and adjusted to pH 4 by addition of 10% sulphuric acid. A monomer solution of 32 gms of 1,3-butanediol diacrylate (BDDA, available from Sartomer), and 0.15 gm of Vazo 64, (available from DuPont) was added to 56 gm of the aqueous mixture and then stirred in a waring blender for two minutes at the low speed setting. The mixture was then poured into a glass bottle which was then purged with nitrogen, sealed and placed in a shaker water bath at 70° C. for 20 hours. The contents of the bottle were then collected on a Buchner funnel and washed several times with water to yield a wet cake. The wet cake was then dried at ambient temperature to give free-flowing powder.

Polymeric beads having other compositions could also be prepared using such a procedure. These include beads having varying ratios of hexanedioldiacrylate and stearyl methacrylate, mixtures of BDDA and SMA, BDDA and lauryl acrylate, and the like.

Preparation of Submicron Polymeric Beads

A mixture of 192 gms of 1,6-hexanediodiacrylate, available from Sartomer, 192 gms of stearyl methacrylate, available from Rohm and Haas, and 1.2 gms of Vazo TM 64, available from DuPont was stirred in a beaker until the Vazo was completely dissolved. It was then added to a 2 liter resin flask containing 28.8 gms of "Dehyquart A", a 25% solution of cetyltrimethylammonium chloride, available from Henkel Corp., and 820 gms of DI water. The flask was then stirred at 700 rpm for 2 minutes. A coarse emulsion was obtained, which was then passed through a Manton-Gaulin Homogenizer from Gaulin Corp. at 500 psi. The emulsion was passed through the homogenizer a second time. The homogenized emulsion was then returned to the resin flask and heated to 60° C. It was maintained at the temperature for 15 hours under gentle agitation (400-500 rpm) with a nitrogen blanket. A stable emulsion was obtained having about 30% submicron polymeric beads. Analysis on a Coulter N4 from Coulter Electronics, Inc. revealed an average particle size of 0.25 μm.

The Examples below are illustrative of the present invention and are not limiting in nature. Variations will be apparent to those skilled in the art. The scope of the invention is solely that which is defined by the claims.

EXAMPLES

Example 1

An emulsion polymer was prepared according to the following procedure:

1. Preparation of Emulsion Polymer

The following ingredients were admixed according to the procedures described below to make a latex binder for coating on plain paper copier transparency film.

TABLE 1

| INGREDIENTS | WEIGHT % |
|---|---|
| Deionized Water | 73.9 |
| Triton X405 (from Union Carbide) | 1.23 |
| Isobornyl Acrylate (from CPS Chemical Co.) | 8.63 |
| Methyl Methacrylate (from Rohm Haas Co.) | 9.86 |
| Ethyl Acrylate (from Rohm Haas Co.) | 4.93 |
| Dimethyl Amino Ethyl Methacrylate (from Rohm Haas Co.) | 1.23 |
| Carbon Tetrabromide (from Olin) | 0.05 |
| Ammonium Persulfate (from J. T. Baker) | 0.07 |

To prepare the present emulsion polymer, Deionized water (DI water) and surfactant (Triton X405) were charged into a four-neck flask equipped with a reflux condenser, thermometer, stirrer, metering pump and a nitrogen gas inlet. This was stirred and heated to 70° C. under nitrogen atmosphere. In the meantime the monomers, IBOA, MMA, EA, DMAEMA and carbon tetrabromide (a chain transfer agent), were pre-mixed in a separate container at room temperature to make the monomer premix. When the reaction temperature leveled off at 70° C., 20% of the monomer premix and the initiator (ammonium persulfate) were charged into the reactor to start the polymerization. The reaction was allowed to exotherm. At the exotherm peak, the remaining 80% monomer premix was fed into the reaction using a metering pump over a two-hour period while the reaction temperature was maintained at 70° C. After the monomer addition, the polymerization was continued for two hours at 70° C. to eliminate residual monomers. The latex was then cooled to 25° C. and filtered through a 25 μm filter.

2. Mixing of Latex Coating Solution 16.54 gms of Texanol TM was slowly added to 661.67 gms of latex with stirring. 3.57 gms of 50% solids solution of Cyastat TM SN was then added along with 3.57 gms of 50% solids solution Cyastat TM 609. 85.0 gms of 10% solids FC 170C premix was then introduced into the latex with stirring, along with 16 gms of SMA beads having a particle size of 4 μm, 16 gms of SMA beads having a particle size of 8 μm, and 39.7 gms of A1120 adhesion promotor, available from Union Carbide.

To this solution was added D.I. water, to make up a total of 3400 gms. Finally, 2.6 gms of 10% solids solution of Dow 65 defoamer was added with mixing. The final coating solution of latex had a concentration of 5.7% solids.

3. Coating of the Latex Coating Solution

Using a gravure roll coating device, the coating solution was applied on an air corona treated 100 μm poly(ethylene terephthalate) (PET) film, and dried. The drying of the coated web was done in two steps inside the oven with zone 1 set at 93° C. and zone 2 set at 149° C. The web remained in each zone for 12 seconds. The dried coating weight was 0.26 gms/m$^2$.

4. Measurement of Properties

All the properties, both functionals and nonfunctionals, were measured using various commercially available copiers. The results are summarized in the following table.

Receptor sheets of the invention were fed into five different copiers at various temperatures and relative humidities. The following table shows the number of misfeeds for each machine, and the total sheets fed.

TABLE 3-continued

| COPIER | CONDITIONS | MISFEEDS EX 1 | EX 2 |
|---|---|---|---|
| Mita DC 4585 | 70° F./50/R.H. | 0/300 | |
| Canon NP 6670 | | | 1/200 |

Example 2

A. Imaging media of the present invention were prepared in the following manner:

SYNTHESIS OF POLY(MA/MMA/IBOA/DMAEMA-SALT)/IGEPAL CA720

In a kettle were charged 532 parts of MA, 532 parts of MMA, 210 parts of IBOA, 98 parts of DMAEMA-SALT, 28 parts of Igepal CA720 surfactant, 3.9 parts of VAZO TM 64, 1300 parts of MEK and 1300 parts of $CH_3OH$. The solution was purged with nitrogen for 10 minutes. The kettle was sealed and heated at 65° C. for 24 hours. The conversion was 100% by percent solids calculation. The polymer solution was transferred to another kettle and 5000 parts of DI water was added to it. The organic solvent was removed by evaporation at 70°-80° C. under vacuum. The aqueous polymer solution was obtained as 20% solids. The ratio of monomers in the above polymer was 38/38/15/7/2.

B. Preparation of the Coating Solution

To a 10 gallon pail was taken 14024.7 parts of DI water. To this was added 22418.6 parts of 20% solid solution and stirred for 5 minutes. While stirring was continued, 126.54 parts of Cyastat SN and 126.54 parts of Cyastat 609 were gradually added to mix well. After stirring for another 2 minutes, 85.4 parts of 10 μm PMMA beads and 218.8 parts of 5 μm SMA beads were gradually added with stirring. Finally the whole solution was stirred for 5 more minutes.

C. Coating Step

The above solution was then coated onto a 100 μm polyester terephthalate (PET) film which had been corona treated to improve adhesion, using a gravure roll, at a dry coating weight of 0.2 g/m$_2$. The coated film was then dried at about 120° C. for 45 seconds. The results are shown in Table 2.

Examples 3 and 3C

These examples were made in the same manner as Example 1. Example 3 used PMMA particles having a size distribution of 3-5 μm, and SMA particles having a particle size distribution of 10-15 μm. The coefficient of friction of this sheet was 0.375, and when the sheets were tested in a Xerox TM 5028 copier, there were 0 failures in 100 sheets fed. Comparative Example 3C was made with PMMA beads having a size distribution of 3-5 μm, and PMMA particles having a particle size distribution of 10-15 μm. The coefficient of friction of this sheet was 0.412, and when the sheets were tested in the Xerox TM 5028 copier, there were 16 failures in 100 sheets fed.

TABLE 2

| EX | COF | SURFACE RESISTIVITY (Ω/sq, 50% RH, 25° C.) S1 | % HAZE PRECOPY | POSTCOPY | COATING DURABILITY | TONER ADHESION (g) | FEED FAILURE /100 |
|---|---|---|---|---|---|---|---|
| 1 | .23 | $1.7 \times 10^{11}$ | 1.1 | 1.4 | 4 | >1100 | see table 3 |
| 2 | .37 | $2.2 \times 10^{12}$ | 2 | 2 | 4 | >1100 | see table 3 |

TABLE 3

| COPIER | CONDITIONS | MISFEEDS EX 1 | EX 2 |
|---|---|---|---|
| Xerox 5028 | 70° F./50/R.H. | 0/300 | 1/300 |
| Xerox 5028 | 70° F./20/R.H. | 0/200 | 1/300 |
| Xerox 5028 | 80° F./80/R.H. | 0/100 | 0/100 |
| Xerox 5065 | 70° F./50/R.H. | 0/300 | 0/400 |
| Ricoh 7060 | 70° F./50/R.H. | 0/300 | 15/500 |
| Sharp SF8870 | 70° F./50/R.H. | 0/300 | |

This example demonstrates that SMA particles both lower the COF and improve the feeding performance.

Examples 4-9

Imaging media of the present invention were prepared in the following manner:

SYNTHESIS OF POLY(MA/MMA/IBOA/-HEMA/DMAEMA-SALT): A bottle was charged with 11.2 parts of MA, 12.2 parts of MMA, 4.8 parts of IBOA, 0.64 parts of HEMA, 3.2 parts of DMAEMA-SALT, 20 parts of methanol, 38 parts of MEK and 0.09 parts of Vazo™ 64 were charged. The solution was purged with nitrogen for 10 minutes. The bottle was sealed and placed in a Launder-o-Meter™ at 65° C. for 24 hours. 100% conversion was obtained. The polymer solution was transferred to a flask and 120 gms of DI water was added. The organic solvent was removed by rotary evaporation at 70°-80° C. under vacuum. An aqueous polymer solution was obtained.

This was repeated with varying amounts of the monomer components as shown in Table 4. Coating solutions of these polymers were prepared in the same manner as Example 2 and coated in the same manner. PMMA beads were used in these experiments since the purpose was to demonstrate the effects of toner adhesion of the polymer with varying amounts of IBOA. These were tested for toner adhesion and the results are shown in Table 4.

TABLE 4

| EX | IBOA | DMAEMA SALT | MA | MMA | HEMA | TONER ADHESION (g) |
|---|---|---|---|---|---|---|
| 4 | 0 | 4 | 45 | 49 | 2 | 200 |
| 5 | 5 | 10 | 40 | 43 | 2 | 550 |
| 6 | 10 | 10 | 37 | 41 | 2 | 800 |
| 7 | 15 | 10 | 35 | 38 | 2 | >1000 |
| 8 | 20 | 10 | 33 | 35 | 2 | >1000 |
| 9 | 28 | 10 | 29 | 31 | 2 | >1000 |

Examples 10 and 11

A 500 μcm thick poly(ethylene terephthalate) (PET) film was extruded at a temperature of about 260°-300° C. at a speed of about 30 meters/min. It was then uniaxially oriented in the machine direction three times and corona treated. Then a solution of the composition shown in Table 5 was coated onto one side of the PET film at a dry coating weight of 0.78 g/m$^2$.

After drying, the film was then identically coated on the opposing side and dried. Finally, the film was oriented in the transverse direction four times to yield a dry coating weight of 0.19 g/m$^2$ on each side.

Example 11 was made in the same manner as Example 10 except that only the first side was corona treated. These sheets were tested in the same manner as those in Example 1, and the results are shown in Table 6.

TABLE 5

| EMULSION FORMULATION | WEIGHT (g) | % SOLID SOLUTION | % OF TOTAL |
|---|---|---|---|
| MMA/EA/IBOA/ DMAEMA/CBr4 39.8/20/35/5/0.2 | 2322.06 | 25% | 56.3% |
| Propylcarbitol | 185.76 | 50% | 9% |
| NMP | 325.09 | 50% | 15.75% |
| Cyastat SN | 64.26 | 50% | 6.73% |
| Cyastat 609 | 64.26 | 50% | 6.23% |
| SMA Beads (0.25 μm) | 12.34 | 30% | 6.23% |
| SMA Beads (4 μm) | 61.51 | 30% | 1.77% |
| Triton X-100 | 34.00 | 30% | 1% |
| A1120 | 139.32 | 25% | 3.36% |
| DI Water | 191.40 | — | — |
| Defoamer Dow 65 | 0.26 | 100% | — |

TABLE 6

| EX | COF | SURFACE RESISTIVITY (Ω/sq, 50% RH, 22° C.) S1 | S2 | % HAZE PRECOPY | POSTCOPY | COATING DURABILITY | TONER ADHESION (g) | FEED FAILURE /100 |
|---|---|---|---|---|---|---|---|---|
| 10 | .24 | $9.2 \times 10^{10}$ | $1.0 \times 10^{-7}$ | 2.8 | 3.5 | 4 | >1100 | 0 |
| 11 | .19 | $7.8 \times 10^{10}$ | $1.0 \times 10^{-7}$ | 2.9 | 3.5 | 4 | >1100 | 0 |

Examples 12-20

These examples demonstrate the usefulness of monomers other than IBOA and IBOMA to yield good toner adhesion. Because only toner adhesion was to be tested, no novel particles were added. The examples were prepared in the same manner as Example 1, except in small quantities. The imaging copolymer contains "Monomer 1/MMA/EA/DMAEMA/CBr$_4$", in the following ratios: 35/40/20/5/0.2. The formulations were varied by substitution of differing components as monomer 1. The formulation also contained 8% NMP, 2% (50% solution) Cyastat™ SN, 2% (50% solution) Cyastat™ 609, 2% PMMA beads having a particle size of 5-15 μm, the weight percent based on the solid resin and 0.1% FC 170C, the weight percent based on the coating solution. The compositions, COF and toner adhesion results are results are shown in Table 7.

TABLE 7

| EX | IDENTITY OF MONOMER 1 | PEAK COF | AVG COF | TONER ADHESION (g/m$^2$) |
|---|---|---|---|---|
| 12 | methyl methacrylate | 0.194 | 0.145 | 500 |
| 13 | isodecyl methacrylate | 0.534 | 0.156 | >1100 |
| 14C | lauryl acrylate | 0.237 | 0.219 | <200 |
| 15C | stearyl methacrylate | 0.270 | 0.245 | <100 |
| 16 | cyclohexyl methacrylate | 0.240 | 0.236 | 200 |
| 17 | phenoxyethyl acrylate | 0.351 | 0.221 | >1100 |
| 18 | isobutyl acrylate | 0.214 | 0.203 | 900 |
| 19 | dicyclopentenyl methacrylate | 0.266 | 0.174 | >1100 |
| 20 | styrene | 0.318 | 0.215 | >1100 |

Examples 21-28

These examples were made in the same manner as Example 2, except for Example 21, where DEAEMA was used and the preparation of the polymer is described as follows:

SYNTHESIS OF POLY(MA/MMA/IBOA/-HEMA/DEAEMA-SALT) A bottle was charged with 11.2 parts of MA, 12.2 parts of MMA, 4.8 parts of IBOA, 0.64 parts of HEMA, 3.2 parts of DEAEMA-SALT, 20 parts of methanol, 38 parts of MEK, and 0.09 parts of Vaxo TM 64. The solution was purged with nitrogen for 10 minutes. The bottle was sealed and placed in a Launder-o-meter TM at 65° C. for 24 hours. The contents of the bottle were transferred to a flask and 120 gms of DI water was added. The organic solvent was removed by evaporation under vacuum at 70° C. An aqueous polymer solution was obtained.

The formulations were varied by using different monomers for the imaging polymer, and using 3% by weight of SMA/HDDA beads having particle size distributions of 3-5 μm. Comparative Example 23C was made with 5-15 μm PMMA beads.

These examples demonstrate that COF is related to the bead type as well as the acrylic polymer composition. When SMA beads were present, a useful COF range was obtained, regardless of the range of the acrylic polymer composition used. The compositions and COF are listed in Table 8.

TABLE 8

| EXAMPLE | COMPOSITION/RATIOS | PEAK COF |
|---|---|---|
| 21 | MA/MMA/HEMA/DEAEMA SALT<br>53/38/2/7 | 0.19 |
| 22 | MA/MMA/IBOA/HEA/DMAEMA SALT<br>40/28/20/2/10 | 0.40 |
| 23C | MA/MMA/IBOA/HEA/DMAEMA SALT<br>40/28/29/2/10 | 0.58 |
| 24 | MA/MMA/IBOA/HEA/DMAEMA SALT<br>35/38/15/2/10 | 0.32 |
| 25 | MA/MMA/IBOA/HEMA/DMAEMA SALT<br>35/38/15/2/10 | 0.30 |
| 26 | MA/MMA/IBOA/HEMA/DMAEMA SALT<br>40/38/10/2/10 | 0.22 |
| 27 | MA/MMA/IBOA/HEMA/DMAEMA SALT<br>45/38/5/2/10 | 0.25 |
| 28 | MA/MMA/IBOMA/HEMA/DMAEMA SALT<br>45/38/5/2/10 | 0.27 |

Examples 29-33

These Examples were made according to Example 1. The compositions all contained 0.018 gm SMA beads having a particle size of 0.025 μm and 0.089 gm SMA beads having a particle size of 4 μm, 3 parts by weight of Triton TM X-100. Different levels of emulsion polymer, NMP, a 1:1 mixture of Cyastat TM 609/SN, and varied coating weights were used as shown in Table 9. Test results are shown in Table 10.

TABLE 9

| EX | EMULSION POLYMER | NMP | P-CARBITOL | A1120 | DI WATER | CYASTAT 609 | CYASTAT N | COATING WEIGHT (g/m²) |
|---|---|---|---|---|---|---|---|---|
| 29 | 8.97 | .63 | 0.36 | .13 | 86.62 | 0.09 | 0.09 | .15 |
| 30 | 19.69 | 1.38 | 0.79 | .30 | 74.57 | 0.09 | 0.09 | .33 |
| 31 | 19.61 | 1.37 | 0.79 | .29 | 74.61 | 0.11 | 0.11 | .33 |
| 32 | 14.30 | 1.00 | 0.57 | .21 | 80.60 | 0.10 | 0.10 | .21 |

TABLE 10

| | | SURFACE RESISTIVITY (Ω/sq) | | HAZE | | TONER COATING | ADHESION | FEED FAILURE |
|---|---|---|---|---|---|---|---|---|
| EX | COF | S1 | S2 | PRE-COPY | POST-COPY | DURABILITY | (g) | /100 |
| 29 | .22 | $7.0 \times 10^{10}$ | $7.0 \times 10^{10}$ | 3.4 | 3.5 | 3+ | 1160 | 0 |
| 30 | .45 | NA | $1.4 \times 10^{14}$ | 1.9 | 2.1 | 2 | 1160 | 0 |
| 31 | .33 | $6.1 \times 10^{11}$ | $5.3 \times 10^{11}$ | 2.2 | 2.4 | 2 | 1160 | 1 |
| 32 | .25 | $2.4 \times 10^{11}$ | $2.8 \times 10^{11}$ | 2.0 | 2.3 | 4 | 1160 | 0 |

Examples 33-37

68.4 parts of the emulsion polymer of Example 1 were mixed with 8.2 parts of NMP, 6.72 parts Cyastat TM SN, 3.37 parts of Cyastat TM 609, 1.8 parts of FC-170C and 87.42 parts of DI water to produce a master batch. 29.4 gms of the master batch was transferred to a separate vessel and 0.55 gm of a 10% solids solution of beads having a distribution of 5-15 μm, as described in Table 11, was added to form a coating dispersion. The dispersion was then coated on a 100 μm PET film which had been primed with polyvinylidiene chloride (PVDC) using a #4 Meyer TM bar. The coated sheets were laid flat on cardboard and dried for 2 minutes at 125° C. The sheets were then tested for toner adhesion on a Xerox TM 1038 copier, and COF, and the results are also shown in Table 11.

TABLE 11

| EX | TYPE OF BREAD | TONER ADHESION (g) | PEAK COF/ AVG COF |
|---|---|---|---|
| 33 | $C_{14}$dioldiacrylate | >1100 | 0.235/0.160 |
| 34 | LA/BDDA (50/50) | 900 | 0.263/0.141 |
| 35 | dodecanedioldimethacrylate | 960 | 0.214/0.191 |
| 36 | SMA/HDDA (20/80) | >1100 | 0.210/0.190 |
| 37 | MMA/HDDA (20/80) | 980 | 0.208/0.195 |

Examples 38–42

These examples were made according to Example 1. The solution had the following formulation: 0.210 part of a 1:1 blend of Cyastat TM SN/Cyastat TM 609, 0.094 part each of two SMA beads, one having a particle size of 4 μm, and one having a particle size of 8 μm, 2.5 parts FC-170C, and 75 ppm Dow 65 defoamer. The levels of emulsion polymer, adhesion promotor A1120, and Texanol TM were varied as well as the coating weight, and the parts by weight are shown in Table 12. These were tested, and the results are shown in Table 13. When tested for feeding failures on a Xerox TM 1038 copier, none of the Examples had any failures in 100 sheets.

TABLE 12

| EX | EMULSION POLYMER | TEXANOL | A1120 | DI WATER |
|---|---|---|---|---|
| 38 | 8.75 | 0.13 | 0.13 | 88.0 |
| 39 | 8.75 | 0.31 | 0.13 | 88.0 |
| 40 | 30.2 | 0.45 | 0.45 | 66.0 |
| 41 | 30.2 | 1.06 | 0.45 | 65.5 |
| 42 | 19.5 | 0.49 | 0.29 | 76.8 |

TABLE 13

| EX | PEAK COF | COATING WEIGHT ($g/m^2$) | HAZE PRE/-POST | DURA-BILITY | TONER ADHESION (g) |
|---|---|---|---|---|---|
| 38 | 0.21 | 0.13 | 1.6/1.9 | 4 | >1160 |
| 39 | 0.27 | 0.12 | 1.6/1.7 | 4 | >1160 |
| 40 | 0.37 | 0.47 | 2.2/2.8 | 2+ | >1160 |
| 41 | 0.33 | 0.44 | 1.8/2.6 | 4 | >1160 |
| 42 | 0.23 | 0.35 | 2.2/2.4 | 4 | >1160 |

Examples 43C–47

These examples exhibit changes in the imaging polymer, and resultant toner adhesion for these copolymers. These were made in the same manner as Example 1, except with 20 parts of EA, 5 parts DMAEMA, 2 parts of carbon tetrabromide, 3 parts of Triton X-405, and 2% PMMA beads. The amount of IBOA and MMA were varied to show that a critical amount of IBOA had to be added to the emulsion polymer in order to achieve good toner adhesion. The varying amounts are shown in Table 14 aong with toner adhesion measurements. No novel SMA beads were added, as only toner adhesion, and not feedability was to be tested.

TABLE 14

| EX | IBOA | MMA | TONER ADHESION (g) |
|---|---|---|---|
| 43C | 5 | 70 | <100 |
| 44 | 10 | 65 | 220 |
| 45 | 15 | 60 | 270 |
| 46 | 20 | 55 | 700 |

TABLE 14-continued

| EX | IBOA | MMA | TONER ADHESION (g) |
|---|---|---|---|
| 47 | 25 | 50 | >1100 |

Examples 48–51

These examples were made in the same manner as Example 2, except that the novel polymeric beads were not added to complete the image recording sheet. These examples show that toner adhesion does not suffer from variation in the imaging copolymer. The formulations, and ratios of each example were the same except that monomer 1 identity was varied. The monomers present were Monomer 1/MA/MMA/HEMA/DMAEMA SALT; the ratios were 15/35/38/2/10. Example 51, which contains cyclohexyl methacrylate contains 20/40/28/2/10, with all other monomers remaining the same. The formulations also contained 20% of a (10%) solution Cyastat TM 609, and 1.2% PMMA beads having a particle size of 5–15 μm. The monomers 1 identity and toner adhesions are shown in Table 15.

TABLE 15

| EX | IDENTITY OF MONOMER 1 | TONER ADHESION (g) |
|---|---|---|
| 48 | styrene | >1100 |
| 49 | isobutyl acrylate | 250 |
| 50 | isodecyl acrylate | 700 |
| 51 | cyclohexyl methacrylate | >1100 |

Examples 52–55

These were made in the same manner as Example 1, except that the SMA beads, and modified novel beads with a particle size distribution of 3–15 μm were used. These beads were placed in solution, and then coated at different coating weights. These variations are listed in Table 16. The examples were then tested on a Xerox model 5028 and the results are also shown in Table 16. All of the examples tested had 0 failures per 100 feeds. In all of the examples the toner adhesion was greater than 1100 gms.

TABLE 16

| EX | BEAD COMPOSITION | COATING WEIGHT ($g/m^2$) | COF | % HAZE PRECOPY | % HAZE POSTCOPY | COATING DURA-BILITY |
|---|---|---|---|---|---|---|
| 52 | SMA/HDDA 50/50 | 0.092 | .23 | 1.1 | 1.4 | 3 |
| 53 | SMA/HDDA/GMA 50/40/10 | 0.092 | .28 | 1.1 | 1.4 | 2 |
| 54 | SMA/HDDA/Z6040 50/45/5 | 0.104 | .25 | 1.1 | 1.3 | 3 |
| 55 | SMA/HDDA/HBA 50/45/5 | 0.077 | .23 | 1.0 | 1.2 | 3+ |

What is claimed is:

1. A transparent recording sheet comprising a transparent film substrate having two major opposing surfaces, at least one of said surfaces having a water-based toner-receptive layer thereon comprising:

a) from 65 to 99.9 parts of an imaging copolymer formed from 1) from 80 to 99 parts of at least one monomer selected from the group consisting of bicyclic alkyl (meth)acrylates, aliphatic alkyl (meth)acrylates having from one to 12 carbon atoms, and aromatic (meth)acrylates, and 2) from 1 to 20 parts of a polar monomer selected from N,N-dialkyl monoalkyl amino alkyl acrylate, and N,N-dialkyl, monoalkyl amino alkyl methacrylate, and quaternary ammonium salts thereof, b) from 0.1 to 15 parts of at least one polymeric microspheres comprising 1) at least 20 parts polymerized diol di(meth)acrylate having a formula $$CH_2{=}CR^2COOC_nH_{2n}OOCCR^2{=}CH_2$$

wherein $R^2$ is hydrogen or a methyl group, and n is an integer from 4 to 18, 2) from 0 to 80 parts of at least one copolymerized vinyl monomer having the formula $$CH_2{=}CR^2COOC_mH_{2m+1}$$

wherein $R^2$ is hydrogen or a methyl group and m is an integer of from 12 to 40, and 3) from 0 to 30 parts of at least one copolymerized ethylenically unsaturated monomer selected from the group consisting of vinyl esters, acrylic esters, methacrylic esters, styrene, derivatives thereof, and mixtures thereof, totalling 100 parts, and c) from 0 to 20 parts of an antistatic agent selected from the group consisting of cationic agents, anionic agents, fluorinated agents, and nonionic agents.

2. A transparent image recording sheet according to claim 1 wherein said substrate is selected from the group consisting of polyesters, polystyrenes and cellulose triacetate.

3. A transparent recording sheet according to claim 1 wherein said imaging copolymer comprises a monomer selected from the group consisting of isobornyl acrylate, isobornyl (meth)acrylate, dicyclopentenyl acrylate, dicyclopentenyl methacrylate phenoxyacrylate, and phenoxymethacrylate.

4. A transparent recording sheet according to claim 1 wherein said image copolymer comprises an aliphatic alkyl acrylate selected from the group consisting of methyl acrylate, methyl methacrylate, ethyl acrylate, ethyl methacrylate, isobutyl acrylate, isobutyl methacrylate, isodecyl methacrylate.

5. A transparent recording sheet according to claim 1 wherein said imaging copolymer further comprise a monomer selected from the group consisting of styrene, substituted styrene and vinyl esters.

6. A transparent recording sheet according to claim 1 wherein said polar monomer is selected from the group consisting of dimethyl aminoethylmethacrylate, diethylaminoethylmethacrylate, and the bromoethanol salts thereof.

7. A transparent recording sheet according to claim 1 wherein the antistatic agent is selected from the group consisting of steramidopropyldimethyl-$\beta$-hydroxyethyl ammonium nitrate, N,N'-bis (2-hydroxyethyl)-N-(3'-dodecyloxy-2'2-hydroxylpropyl) methylammonium methylsulfate, and mixtures thereof.

8. A transparent recording sheet according to claim 1 wherein said polymeric microsphere contains from about 50 to about 80 parts hexanedioldiacrylate, and from about 50 to about 30 parts stearylmethacrylate, said microsphere having an average particle size of from about 0.25 $\mu m$ to about 15 $\mu m$.

9. A transparent recording sheet according to claim 8 wherein said microsphere further comprises at least one organosilane coupling agent having an alkyl group containing from about 1 to about 8 carbon atoms.

10. A transparent recording sheet according to claim 7 wherein an additional microsphere is also present, said additional microsphere having an average particle size of from about 0.25 $\mu m$ to about 15 $\mu m$, said additional microsphere having an average particle size at least about 4 $\mu m$ from the average particle size of said polymeric microsphere.

* * * * *

UNITED STATES PATENT AND TRADEMARK OFFICE

CERTIFICATE OF CORRECTION

PATENT NO. : 5,310,595

DATED : 5/10/94

INVENTOR(S) : Mahfuza B. Ali, Bill H. Dodge, William H. Hughes, Mohammed Iqbal, Ying-Yuh Lu, Steven J. McMan, Manisha Sarkar and Chi-Ming Tseng It is certified that error appears in the above-identified patent and that said Letters Patent is hereby corrected as shown below:

On the title page, under References Cited, patent number 4,259,422, "Davison" should read --Davidson--.

Column 2, Line 15, "cOated" should read --coated--.

Column 4, Line 55, "t least" should read --at least--.

Column 7, Line 14, "$R^2$" should read --$R_2$--.

Column 9, Line 23, "by" should read --be--.

Column 20, Line 1, after "shown" insert --below--.

UNITED STATES PATENT AND TRADEMARK OFFICE

CERTIFICATE OF CORRECTION

PATENT NO. : 5,310,595 Page 2 of 2

DATED : 5/10/94

INVENTOR(S) : Mahfuza B. Ali, Bill H. Dodge, William H. Huges, Mohammed Iqbal, Ying-Yuh Lu, Steven J. McMan, Manisha Sakar and Chiming Tseng It is certified that error appears in the above-indentified patent and that said Letters Patent is hereby Column 22, Table 16, substitue the following values for values under the column -COATING WEIGHT (g/m²)-:

| | |
|---|---|
| Ex. 52 | .0092 |
| Ex. 53 | .0092 |
| Ex. 54 | .0104 |
| Ex. 55 | .0077 |

Signed and Sealed this

Seventh Day of February, 1995

Attest:

BRUCE LEHMAN

Attesting Officer

Commissioner of Patents and Trademarks